(12) United States Patent
Moeller

(10) Patent No.: US 9,109,652 B2
(45) Date of Patent: Aug. 18, 2015

(54) SELECTION OF COMPONENTS OF A DISC BRAKE AND DISC BRAKE

(75) Inventor: Denny Moeller, Gossel (DE)

(73) Assignee: WABCO RADBREMSEN GMBH, Mannheim (DE)

( * ) Notice: Subject to any disclaimer, the term of this patent is extended or adjusted under 35 U.S.C. 154(b) by 237 days.

(21) Appl. No.: 13/575,884

(22) PCT Filed: Jan. 20, 2011

(86) PCT No.: PCT/EP2011/000224
§ 371 (c)(1),
(2), (4) Date: Oct. 1, 2012

(87) PCT Pub. No.: WO2011/101076
PCT Pub. Date: Aug. 25, 2011

(65) Prior Publication Data
US 2013/0020153 A1   Jan. 24, 2013

(51) Int. Cl.
*F16D 65/18* (2006.01)
*F16D 65/00* (2006.01)
*F16D 121/14* (2012.01)
*F16D 125/28* (2012.01)

(52) U.S. Cl.
CPC ............ *F16D 65/18* (2013.01); *F16D 65/0043* (2013.01); *F16D 2121/14* (2013.01); *F16D 2125/28* (2013.01)

(58) Field of Classification Search
USPC ................ 188/72.9, 72.7, 73.31–73.34, 71.1, 188/72.1, 72.6
See application file for complete search history.

(56) References Cited

U.S. PATENT DOCUMENTS

| 4,071,118 | A | * | 1/1978 | Johannesen ................... 188/71.9 |
| 5,547,048 | A | * | 8/1996 | Anthony ....................... 188/72.9 |
| 5,720,366 | A | | 2/1998 | Guasch et al. |
| 5,833,035 | A | * | 11/1998 | Severinsson .................. 188/72.7 |
| 6,585,086 | B2 | * | 7/2003 | Ortegren et al. ............ 188/73.32 |
| 6,817,452 | B2 | * | 11/2004 | Heinlein ....................... 188/72.9 |

FOREIGN PATENT DOCUMENTS

| DE | 36 10 569 A1 | 10/1987 |
| DE | 10 2008 013514 A1 | 9/2009 |
| EP | 1 944 522 A1 | 7/2008 |

OTHER PUBLICATIONS

English Machine Translation EP 1944522.*
Translation of International Preliminary Report on Patentability for Patent Application No. PCT/EP2011/000224, mailed on Aug. 16, 2012, 7 pages.

* cited by examiner

Primary Examiner — Melanie Torres Williams
(74) Attorney, Agent, or Firm — Schwabe Williamson & Wyatt PC

(57) ABSTRACT

The invention relates to a selection of components of a disc brake, in particular for commercial vehicles, having a brake caliper having an installation opening for installing a brake shaft, a first brake shaft and a second brake shaft, wherein the two brake shafts are coordinated with the brake caliper in such a manner that they can be used to apply the brake. According to the invention, the first brake shaft, but not the second, fits through the installation opening. The further invention relates to a disc brake, in particular for commercial vehicles, having a brake shaft and a brake caliper having an installation opening for installing the brake shaft, wherein the brake shaft is coordinated with the brake caliper in such a manner that said brake shaft can be used to apply the brake. According to the invention, the brake caliper and the brake shaft each have a coding, which allows installation of the brake shaft through the installation opening only if the two codings match.

6 Claims, 10 Drawing Sheets

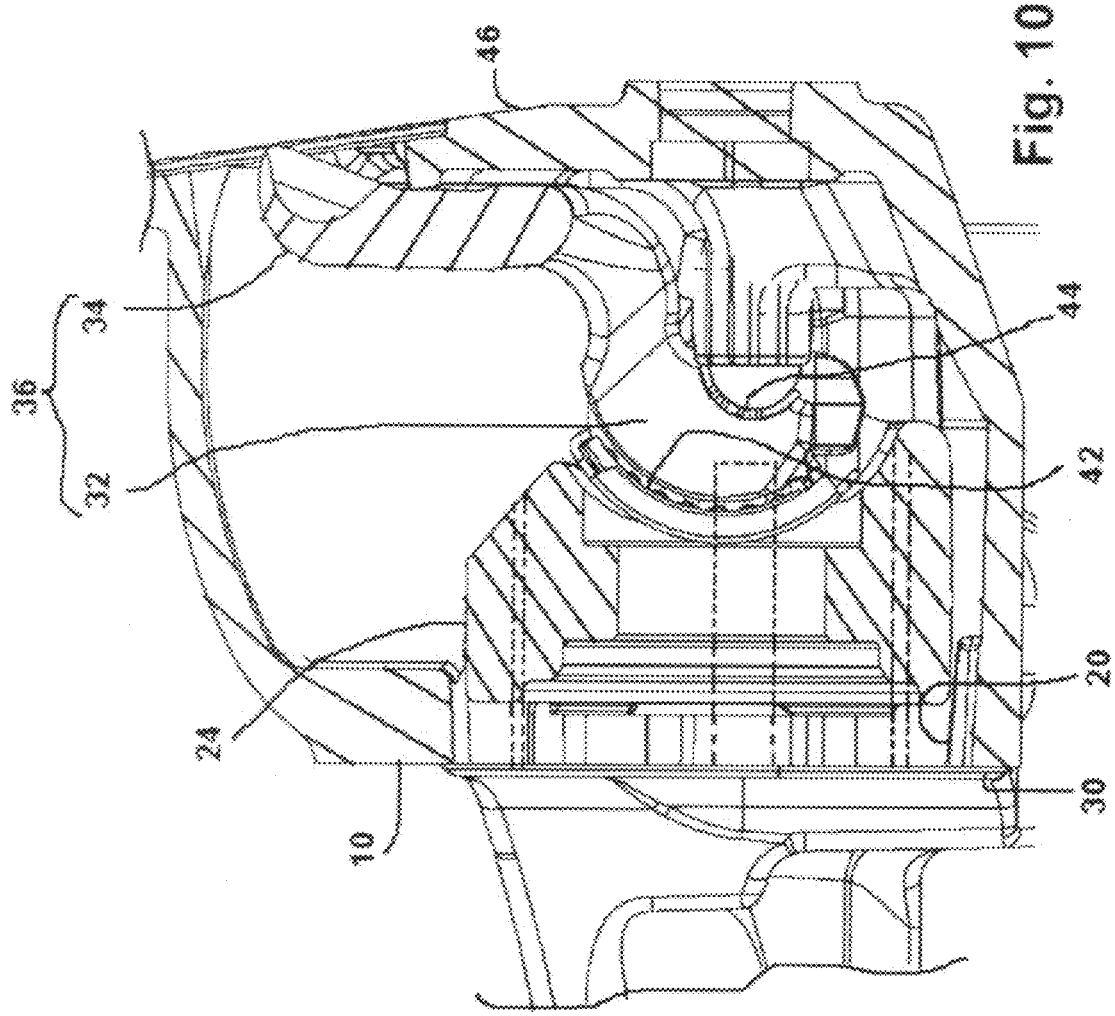

SELECTION OF COMPONENTS OF A DISC BRAKE AND DISC BRAKE

CROSS REFERENCE TO RELATED APPLICATIONS

The present application is a 35 U.S.C. §371 national phase entry application of international Patent Application No. PCT/EP2011/000224, filed Jan. 20, 2011, which claims priority to German Patent Application No. DE102010005909.9, filed Jan. 27, 2010, the disclosures of which are hereby incorporated by reference in their entirety for all purposes except for those sections, if any, that are inconsistent with this specification.

TECHNICAL FIELD

The invention relates to a selection of components of a disc brake, in particular for commercial vehicles, comprising a brake caliper with an installation opening for installing a brake shaft, a first brake shaft and a second brake shaft, wherein the two brake shafts are matched with the brake caliper such that they can be used to apply the brake.

BACKGROUND

Selections of the above named type are known. Consequently, numerous brake manufacturers and distributors are offering brakes which are intended for different application fields and/or vehicle types. Whilst the calipers of these brakes are frequently identical, the brakes in the respective brake shafts inside the caliper are different. Brake shafts can consequently differ from each other, for example, in that they result in different transmission ratios when the brake is actuated. These different transmission ratios, but also other differences, are decisive whether the brake is suited for a specific field of application and/or for a specific type of vehicle. Because both brake shafts are suitable in terms of their design to interact with the specific caliper, i.e. they can theoretically both serve for applying the brake, it will not be conspicuous during the assembly of the brake if an incorrect brake shaft is installed for the intended field of application.

BRIEF DESCRIPTION OF THE DRAWINGS

Embodiments of the present disclosure will be described by way of example embodiments, but not limitations, illustrated in the accompanying drawings in which like references denote similar elements, and in which:

FIG. 10: is a cross-sectional side elevation of the caliper with the brake application device installed, all in accordance with embodiments of the present disclosure.

DETAILED DESCRIPTION OF EMBODIMENTS

Figure 1:
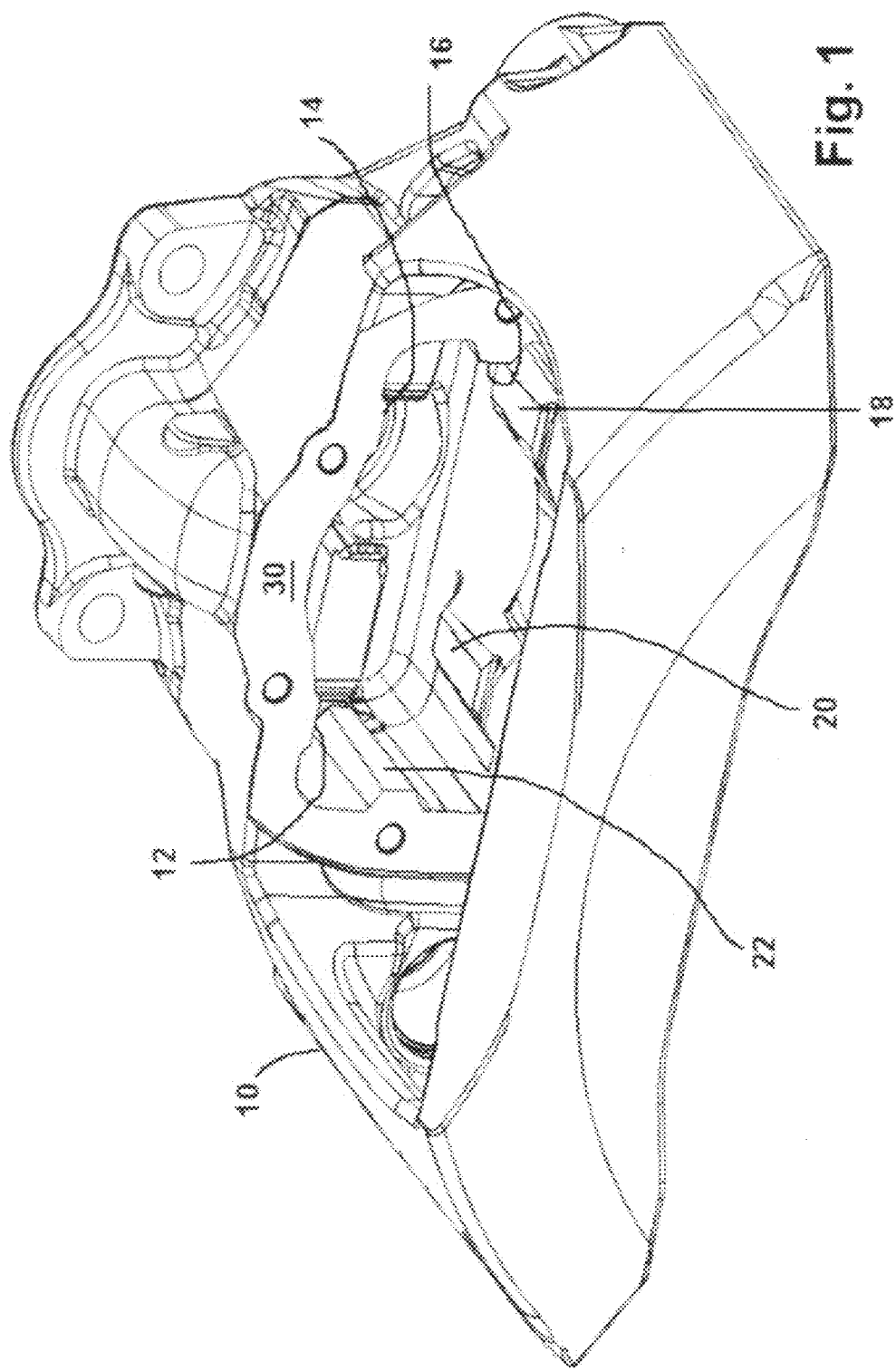
FIG. 1: is an isometric view of a brake caliper pursuant to a preferred embodiment of the invention.
Figure 2:
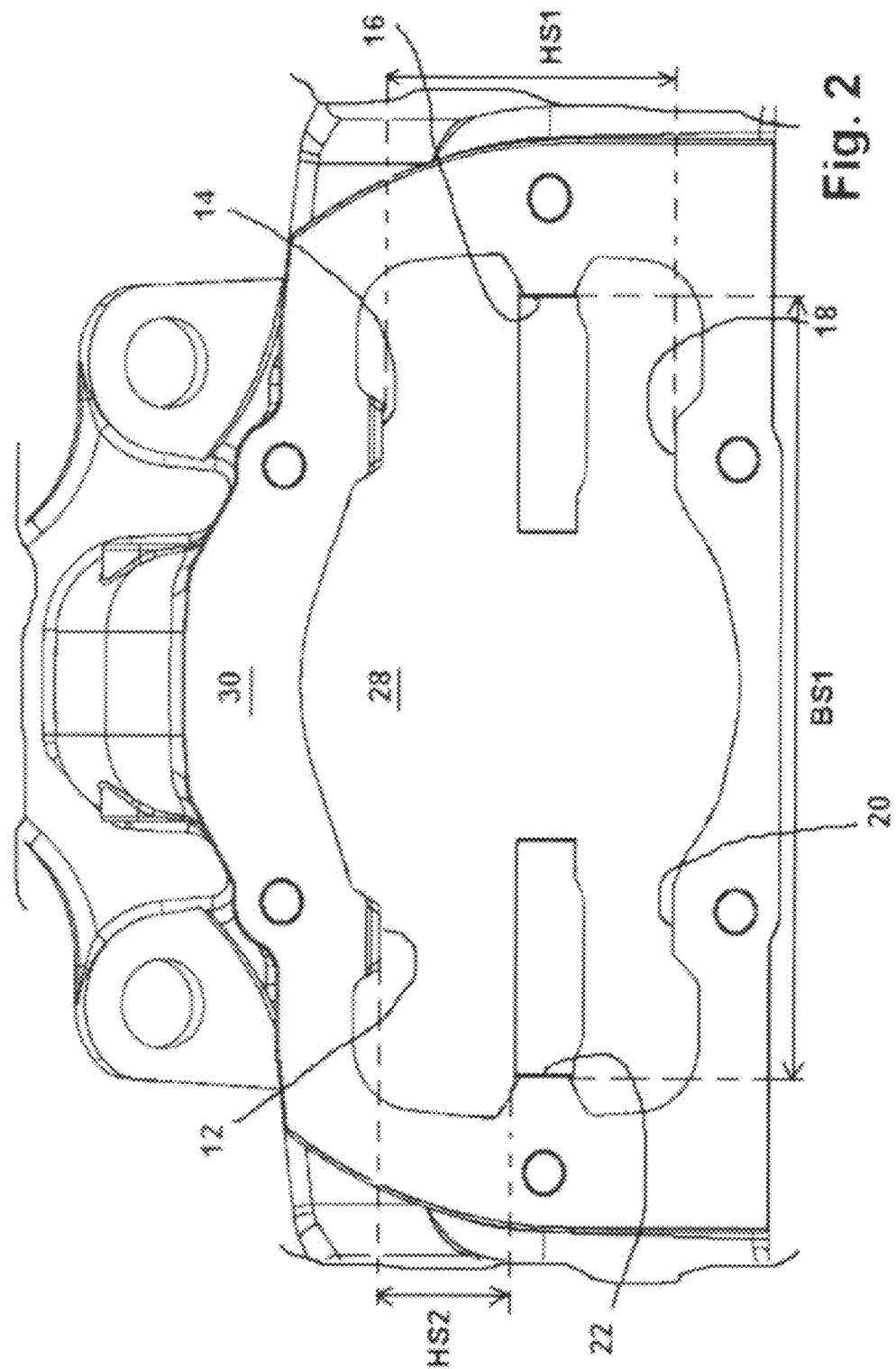
FIG. 2: is a partial cross-sectional view of the caliper.

The object of the invention is therefore to reliably prevent incorrect installation.

The invention teaches that the problem presented here is solved in that the first brake shaft fits through the installation opening, but the second does not.

In other words, the inlet opening creates a type of coding which will permit the installation of the appropriate brake shaft only for the intended field of application, whereas another brake shaft cannot be installed into the caliper due to the inlet opening which serves as coding, even though it is adapted to the brake calipers such that it could serve for the application of the brake at least theoretically. In this manner, it can be prevented, for example, that a brake shaft with the incorrect transmission ratio is installed into a brake caliper.

The invention teaches, that the feature according to which the first brake shaft fits through the installation opening but the second does not, can be accomplished in any optional manner. Preferably it is provided that the installation opening has a first dimension in a first direction and a second dimension in a second direction which is transverse to the first direction, and that the second brake shaft has a first dimension in the first direction, which is larger than the first dimension of the installation opening, and/or in the second direction has a second dimension which is larger than the second dimension of the installation opening.

If "dimension" is referred to above and in the following, then this respectively means a dimension that it is relevant in terms of the issue whether the brake shaft fits through the installation opening.

In this embodiment, the second brake shaft which is unsuitable for the intended field of application will strike against at least one place when attempting to install it into the brake caliper, which is the reason why it does not fit through the inlet opening. This therefore prevents incorrect installation.

The invention teaches that the first direction is perpendicular to the second direction.

Pursuant to a particularly preferred embodiment of the invention it is provided that a device for limiting the first and/or the second dimension of the installation opening and a device for supporting/guiding the brake shaft and/or a rotary lever and/or a pressure piece and/or a pressure screw device overlap at least partially.

In other words, a constriction of the inlet opening and a device for supporting/guiding a component of the brake, such as for instance the pressure piece, concur at least segmentally. Therefore, a dual function exists. In other words, an element to accomplish the abovementioned coding is used simultaneously for supporting/guiding a component of the brake. As a result, the number of components can be reduced.

Apart from the abovementioned selection of components of a disc brake, the invention also creates a disc brake, particularly for commercial vehicles with a brake shaft and a brake caliper comprising an installation opening for installing the brake shaft, wherein the brake shaft is matched to the caliper such that it can be used for applying the brake, wherein the invention teaches that it is provided that the brake caliper and the brake shaft each have a coding, which permits installation of the brake shaft through the installation opening only if the two codings match.

This corresponds essentially with the solution that has already been described in detail above. That is, that a coding is again used to prevent the incorrect installation of an inappropriate brake shaft in the caliper. This occurs because the coding ensures that just only such brake shaft can and will be installed that is suitable for the intended field of application.

According to the invention it is preferably provided that the installation opening has a first dimension in a first direction and a second dimension in a second direction that is transverse to the first direction and that the brake shaft has a first dimension in the first direction and a second dimension in the second direction and it is part of the coding that the first dimension of the brake shaft is smaller than the first dimension of the installation opening and that the second dimension of the brake shaft is smaller than the second dimension of the installation opening. In other words, the invention teaches that in this preferred embodiment the coding is accomplished by the dimensions of the installation opening on the one hand, and of the brake shaft, on the other.

Preferably, the first direction is perpendicular to the second direction.

With respect to the brake shaft, this can involve an eccentric shaft that supports itself on the wall of the brake caliper and when twisted presses a brake pad against a brake disc. For this purpose, the said wall preferably faces away from the brake disc and therefore is in the rear area of the caliper and is designed as one piece with the caliper, i.e. not in the form of a cover or the like, which has mechanical advantages, in particular in terms of strength.

The invention teaches that it is moreover preferred that the brake shaft is part of a rotary lever and/or a rotation axis of the brake shaft lies parallel to a principal plane of a brake disc.

This embodiment is particularly reliable and sturdy. This particularly applies if according to a preferred embodiment of the invention the (actuating) handle which together with the brake shaft constitutes the rotary lever lies within the brake caliper in the installed condition.

The brake must be assembled particularly carefully because a brake represents a safety-relevant component. For this reason it is advantageous to inspect individual components and their position following the installation in the brake caliper.

To render this possible, particularly with respect to the brake shaft, the invention teaches that it is particularly preferred that a preassembled unit comprising the brake shaft in combination with a pressure piece, with a pressure screw device and/or with a bearing device, does not fit through the inlet opening.

The pressure piece could specifically make the inspection of the position of the brake shaft within the caliper more difficult or even impossible following installation, if it were to be installed together with the brake shaft as a preassembled unit, for example.

The embodiment, according to which the brake shaft could for instance not be installed together with the pressure piece as a preassembled unit, on the other hand ensures that the brake shaft can be inspected after its installation in the caliper, namely before the pressure piece is installed.

The invention teaches that a preferred embodiment can particularly be used for a comparable purpose, in which the brake shaft fits through the inlet opening only in a predetermined rotational position, but after passing through the inlet opening inside the brake caliper can be twisted for the purposes of applying the brake. In this context, the rotational position does not signify a specific value, but a rotation angle range which may be rather small.

Because by means of the forced rotational position during the insertion into the inlet opening, this embodiment can specifically prevent that the brake shaft is inserted together with the pressure piece and/or a bearing device as a preassembled unit. At the same time, this ensures the flexibility and/or twistability of the brake shaft required for the functionality of the brake, however.

The invention teaches that the abovementioned coding can be accomplished by integral areas of the brake caliper which determine the contour of the installation opening. However, a coding mask can also be provided which determines the contour of the inlet opening at least partially, which is attached to the caliper for the coding of a caliper, and which is removable or not removable. As a result, the caliper can be designed more universally, whereas it obtains its individuality only by application of the mask.

The invention teaches that the installation opening is preferably facing the brake disc in the assembled condition. In this way, the caliper can have an enclosed design in its (rear) section facing away from the brake disc, which has mechanical advantages, in particular in terms of strength. This solution is also to be preferred to a solution in which the inlet opening is not formed in the (front) section of the brake caliper which is facing the brake disc, but laterally, on the top or on the bottom, because such opening would also weaken the caliper mechanically. On the other hand, the opening facing the brake disc is necessary anyway, because the brake application device through this opening acts upon the brake jaws and therefore upon the brake disc.

Here it must be expressly pointed out that pursuant to the invention all described features in connection with the selection of components of a disc brake described above can likewise be realized with the disc brake described above, and vice versa. Equally, all features described in the following can be applied both with the selection of components of a disc brake described above as well as with the disc brake described above, The invention teaches that the brake caliper is preferably a single piece. The brake application device is supported in its interior. Said brake caliper is essentially closed particularly in its rear area, except for the necessary openings required for functionality, whereas it has merely one opening facing towards the brake disc, through which the functional components can be introduced into the interior in order to then form the brake application device in its entirety.

The invention teaches that for this purpose preferably a rotary lever actuator with an eccentric effect is used to transfer an input force in the area of the flux of force by the internal transmission by means of coupled pressure transmission means, such as a traverse-shaped pressure piece and/or pressure screw devices, into a significantly higher output force in direction of the brake pad and/or the brake disc, as brake force. For that reason, the lever projects from the eccentrically acting brake shaft, at the end of which an actuating mechanism such as an actuating cylinder engages, for example, in order to swivel the rotary lever with the brake shaft about a rotational axis which lies parallel to a plane of a brake disc.

To ensure that during the required brake stroke a friction-reducing contact exists in the power flow and to optimize the installation spaces inside the caliper, partial pivot bearing supports and/or support positions of different designs are preferably provided in order to interconnect the functional components. For this purpose, the functional components contact each other in the sections, additionally still by means of appropriately designed intermediate bearings, for example, such as pivot bearings and/or plain bearings.

Disc brakes with a specific caliper size are frequently installed in different vehicle types during the deployment of vehicles. Because each vehicle type requires also different brake efficiencies, this also requires for the internals to be designed accordingly. This requires changes in the sizes of parts, such as particularly the internal brake transmission ratio via rotary lever/brake shaft. The rotary lever with its brake shaft contour will be configured accordingly, i.e. the geometric contour is assigned to the brake for each application.

The invention renders it possible to prevent an incorrect installation particularly of the rotary lever through the installation opening into the caliper interior. In other words, it ensures that the correct rotary lever is securely assigned to the respective brake caliper and that also the correct installation and/or functional position of the rotary lever in the brake caliper is ensured.

For this purpose, the invention particularly provides that coding/encryption exists between the geometry/contour of the opening and the contour of the rotary lever/brake shaft, wherein the coding is accomplished by various combinations of the geometry of the contact surfaces of the brake caliper on the one hand and the contact surfaces of the rotary lever on the other. Said contact surfaces exist in the form of projections as such and are also matched such that it is only possible to install the respective correct rotary lever in a defined position and/or spatial position into the matching brake caliper housing. This coding will preferably only be effective during the assembly process, which means that once the predefined installation position has been accomplished, the rotary lever is fully functional without any further measures being necessary.

Even though according to a preferred embodiment of the invention, special coding areas between the rotary lever/brake shaft geometry are designed as projections, at other positions they can also be together or be one below the other, if this prevents effectively that an incorrect rotary lever will be installed into a brake caliper. In this instance it is immaterial, how the rotary lever is designed in its entirety and whether it is configured as an eccentrically effective camshaft and whether it is supported/bearing mounted relative to the caliper end.

The installation coding can ultimately be accomplished by individual or multiple measures, such as:

an additional component for the broadening of the brake shaft, to act as the projection, variations of the positions of the lateral projections and/or guide strips in the brake caliper housing and/or projections of the caliper which engage into recesses of the brake shaft or vice versa in accordance with a tongue and groove principle.

As mentioned above previously, the invention provides particularly for a one-piece brake caliper. But it is also applicable for brake calipers consisting of two or multiple sections, provided the installation opening is in a position where it faces the brake disc.

As previously mentioned above, the invention provides in particular that the brake shaft and/or the rotary lever in combination with a pressure piece and/or together with a bearing device, i.e. as a preassembled unit, will not fit through the inlet opening. Which in other words means that the inlet opening is relatively small. In this way, this reduces potential material weakening compared to a larger installation opening. This means that material applications/swelling are hardly required or not at all. As it is, such material applications/swellings in this area are either possible only to a limited extent, or not at all, due to lack of space with respect to other vehicle components, such as wheel rims.

If the inlet opening is too large, material deformations can thus not be excluded, so that due to the associated relative movements in the flange area between the brake caliper and the closing plate, leaks can result. This can be avoided with the smaller inlet opening which is preferred as taught by the invention.

The "small" inlet opening feature in addition meets still a further purpose, namely a stabilization of the caliper by means of inherent rigidity to improve the operational reliability.

The invention can equally be used for single spindle brakes and for two or multiple spindle brakes.

A brake caliper 10 with guide strips 12, 14, 16, 18, 20, 22 is part, of the embodiment illustrated in the drawing. The guide strips serve for guiding a pressure piece 24. The pressure piece in this embodiment is traverse-shaped. A pressure screw device is annotated with the reference number 26.

The brake caliper 10 has an inlet opening 28 facing the brake disc (not shown). The contour of the inlet opening is determined by the guide strips 12 to 22 amongst other things. For this reason, it is also the guide strips which are material in determining what fits through the inlet opening 28. One dimension between the guide strips 14 and 18 is annotated with HS1. One dimension between the guide strip 12 and an edge of the guide strip 22 is annotated with HS2. One dimension between the guide strips 16 and 22 is annotated with BS1. A flange on the periphery of the inlet opening 28 has the reference number 30.

Furthermore, a brake shaft 32 belongs to the brake, which forms a rotary lever 36 together with an actuator 34. On the brake shaft 32, projections 38, 40 are formed on both front faces. One dimension between one side of the projection 40 and a bounding face of the brake shaft 32 is designated with HW1. The dimension between the respective free ends of the projections 38 and 40 is designated with BW 1. The dimension between the two front faces of the brake shaft 32 is designated with BW 2.

As can be particularly seen in FIG. 10, the rotary lever 36 in the installed condition is arranged inside the caliper 10.

Figure 3:
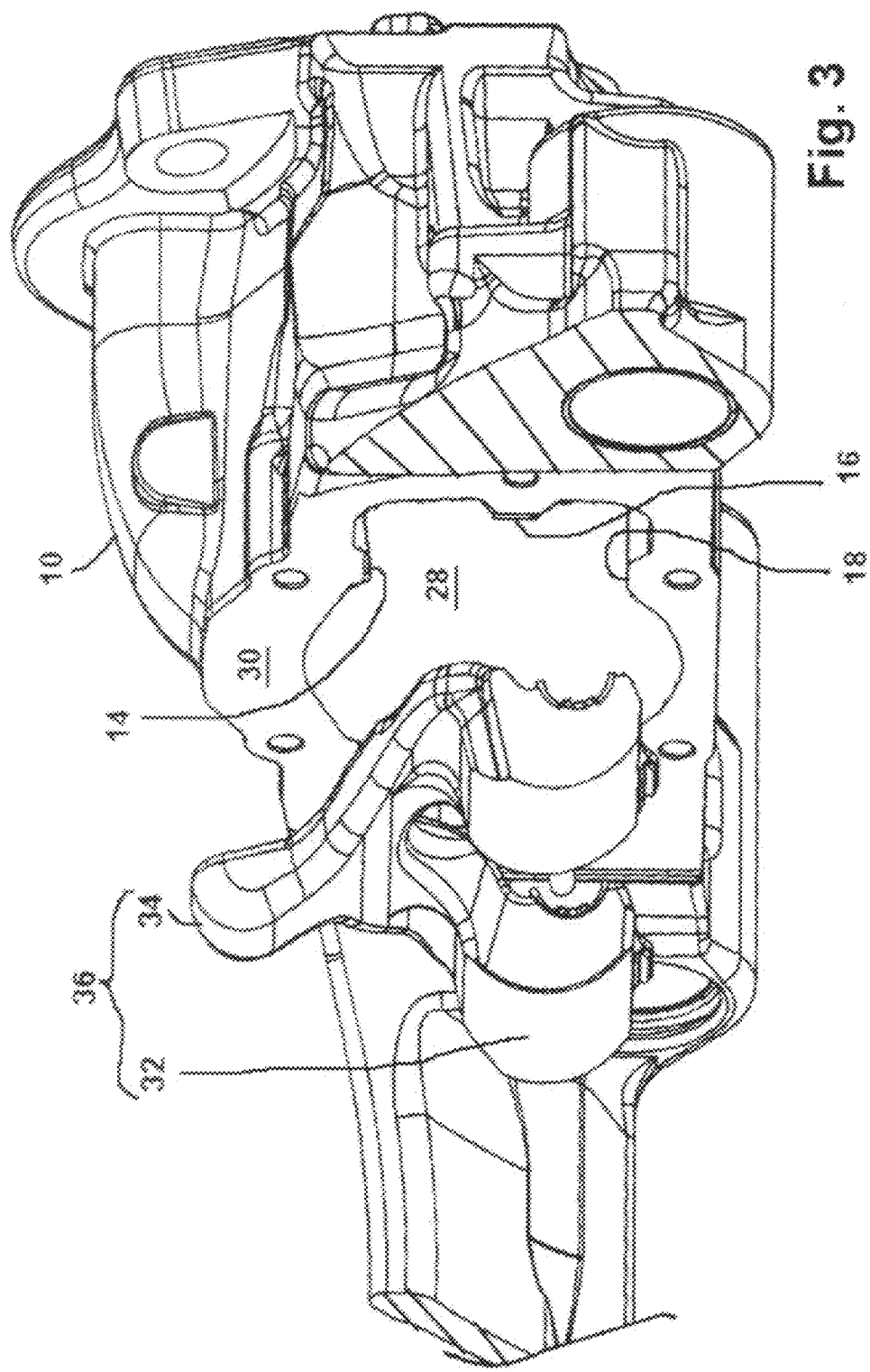
FIG. 3: is a partial cross-sectional side elevation of the caliper with the rotary lever in an exploded view.
Figure 4:
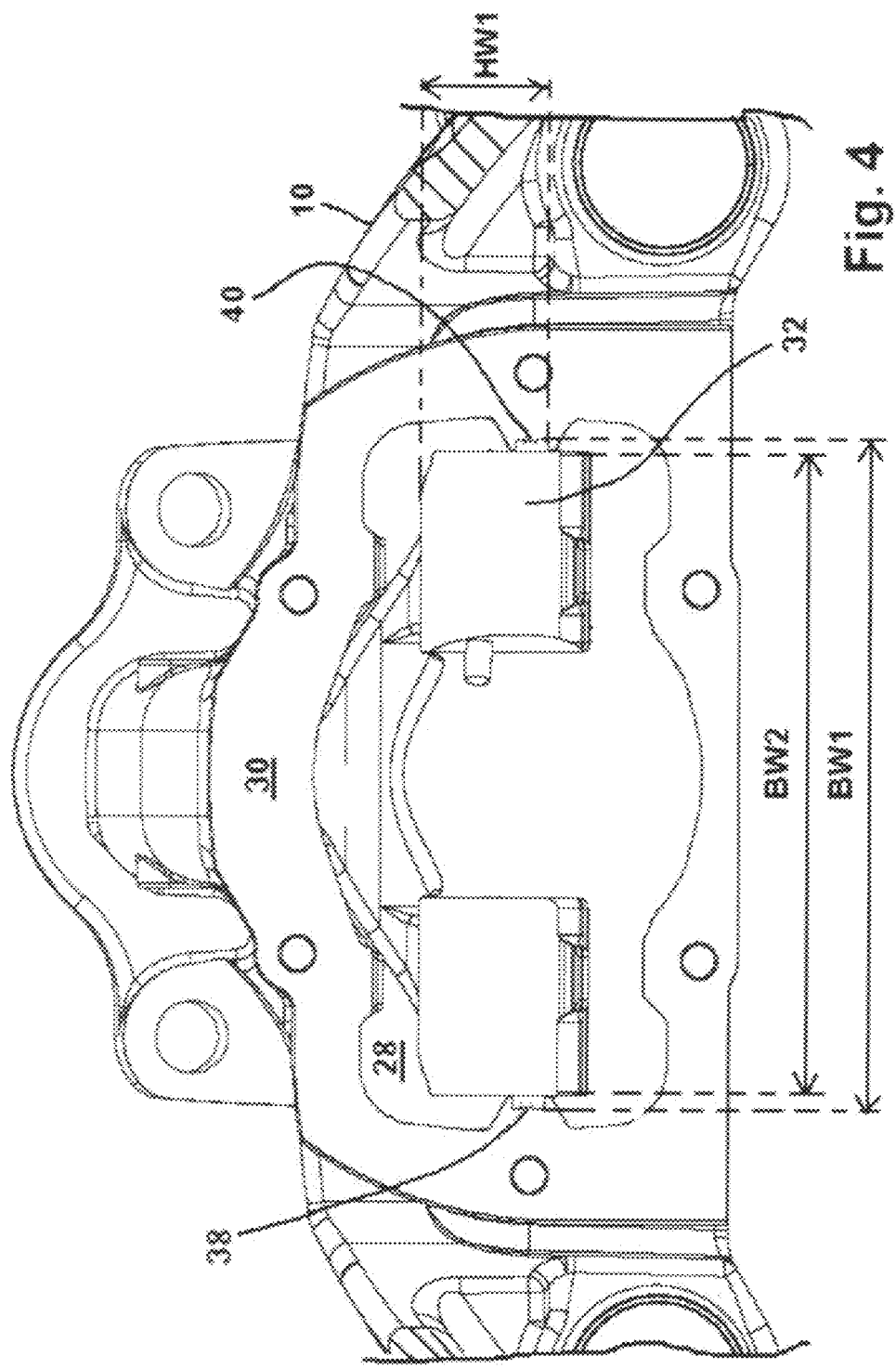
FIG. 4: is the same view as FIG. 2, but with the rotary lever.

FIG. 3 shows the rotary lever 36 and the caliper 10 prior to assembly. In the position according to FIG. 4, the rotary lever 36 and/or the brake shaft 32 cannot be installed in the caliper 10 through the inlet opening 28, because the two protrusions 38, 40 strike against the guide strips 22 and/or 16. Because the dimension BW 1 is actually larger than the dimension BS 1.

Figure 5:
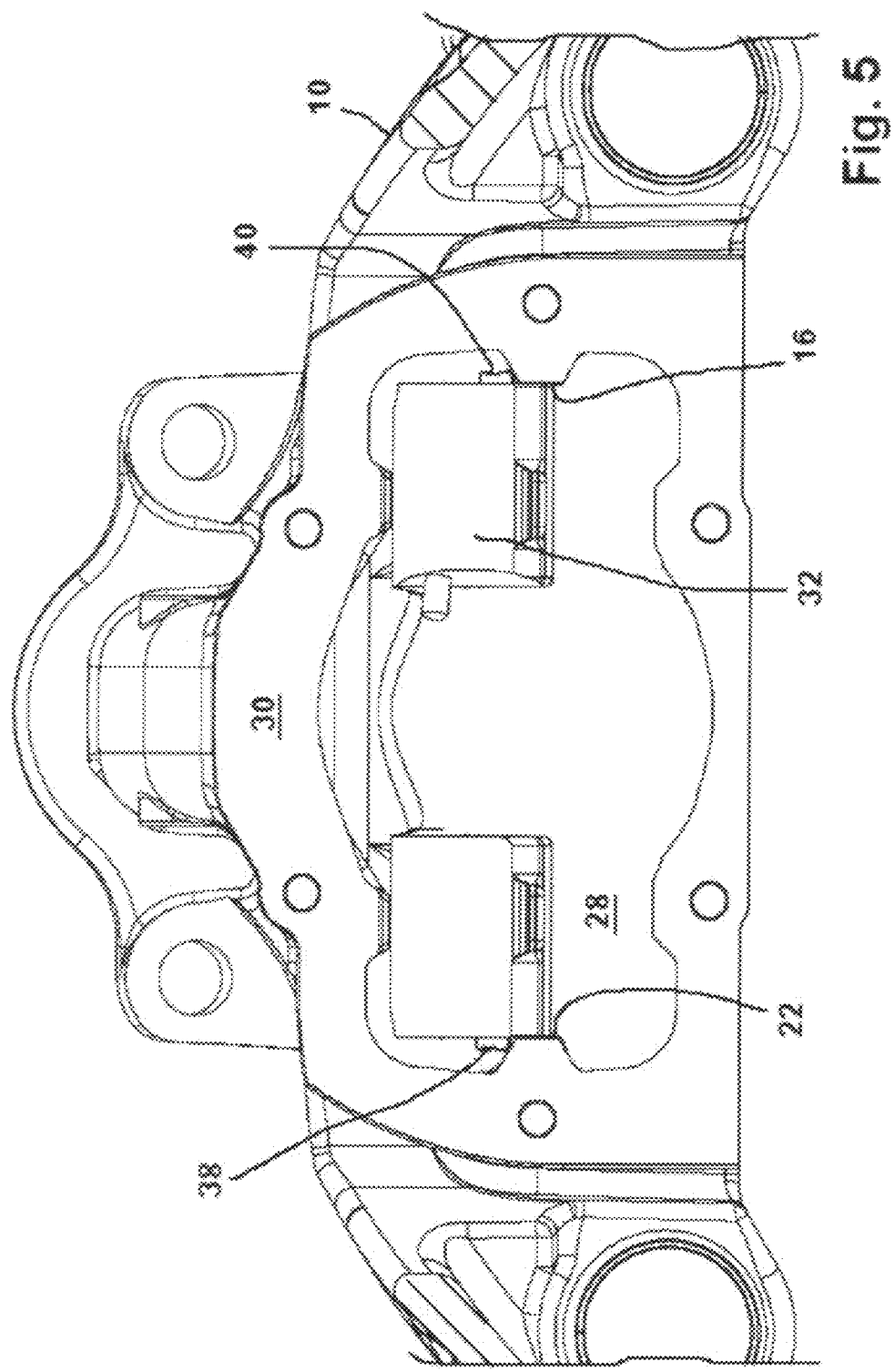
FIG. 5: is the same view as FIG. 4, except in a different mode of operation.
Figure 6:
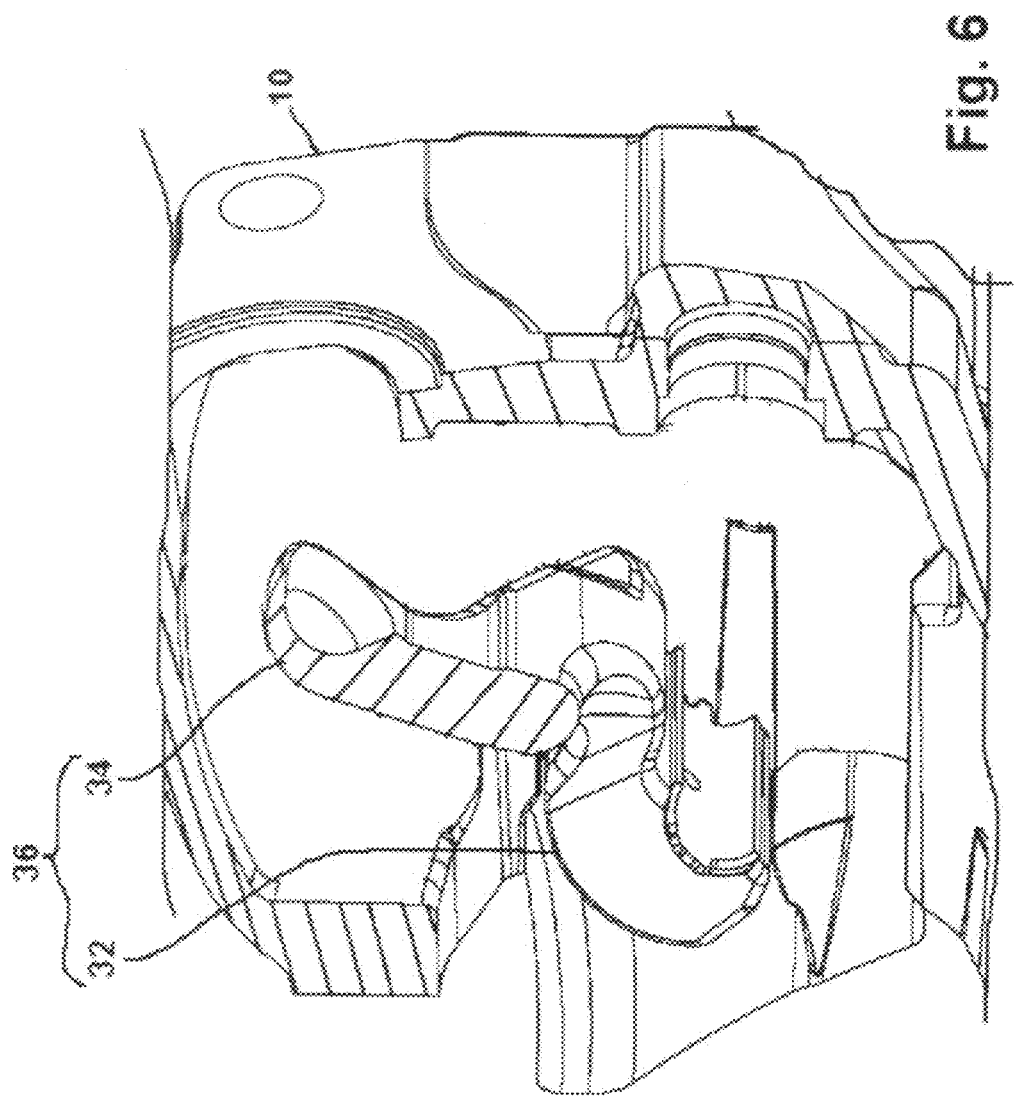
FIG. 6: is a partial cross-sectional view of the caliper with the rotary lever installed.

The rotary lever can be inserted into the interior of the brake element 10 only if the rotary lever 36 and/or the brake shaft 32 is pivoted such that the protrusions 38, 40 are positioned above the guide strips 16, 22 pursuant to FIG. 5.

Figure 7:
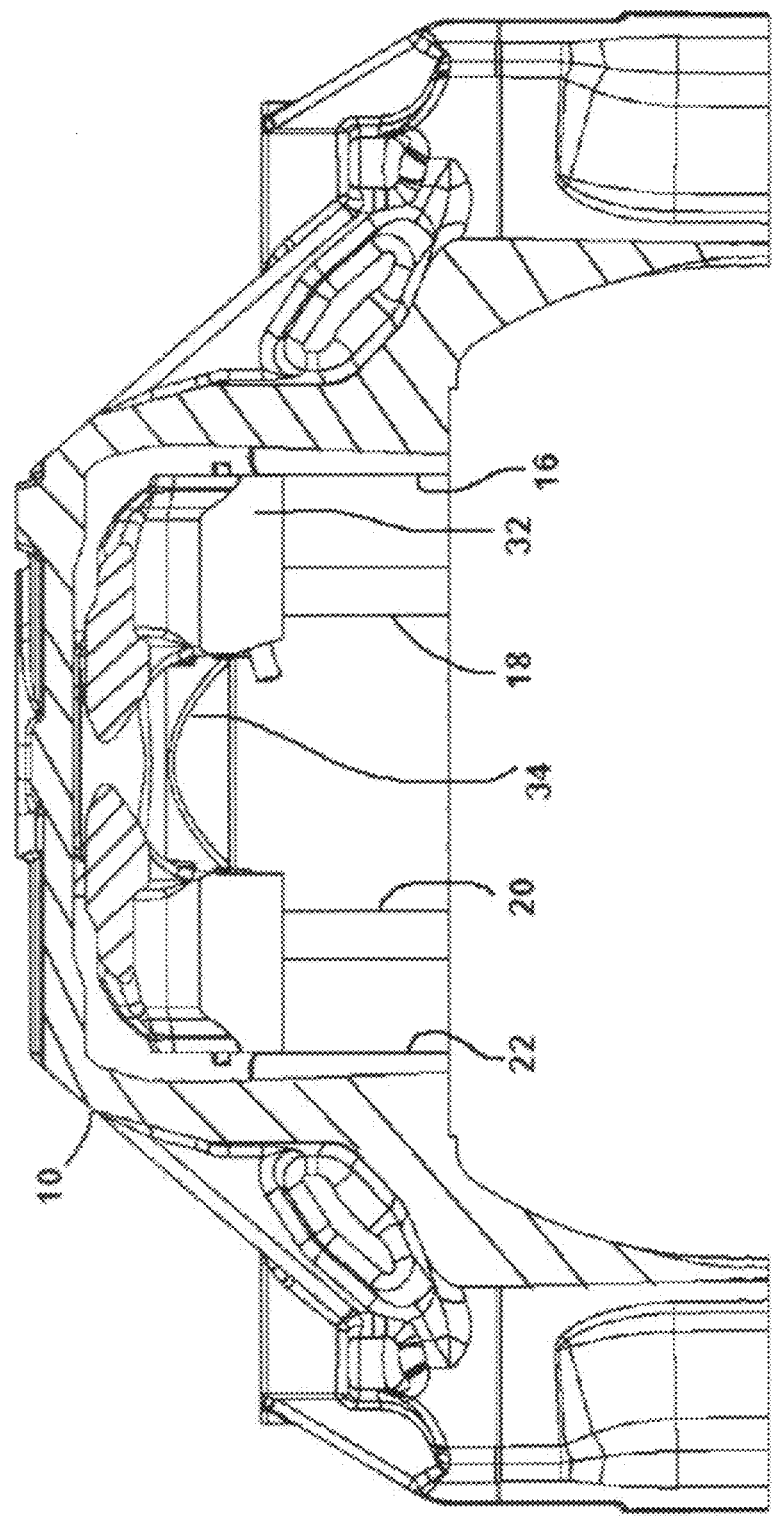
FIG. 7: is a partial cross-sectional plan view of the caliper with the rotary lever installed

In this position of the angle of rotation, as shown in FIG. 5, the brake shaft 32 cannot be in contact with the pressure piece 24 and/or form a preassembled unit with the pressure piece, however, which is why the brake shaft 32 and/or the rotary lever 36 can only be installed without the pressure piece 24 into the caliper 10. FIG. 7 illustrates this position. In the operational state according to FIG. 7, it is possible to inspect the installation position of the brake shaft 32 and/or of the rotary lever 36 unobstructed, because there is no pressure piece to block the view.

Figure 8:
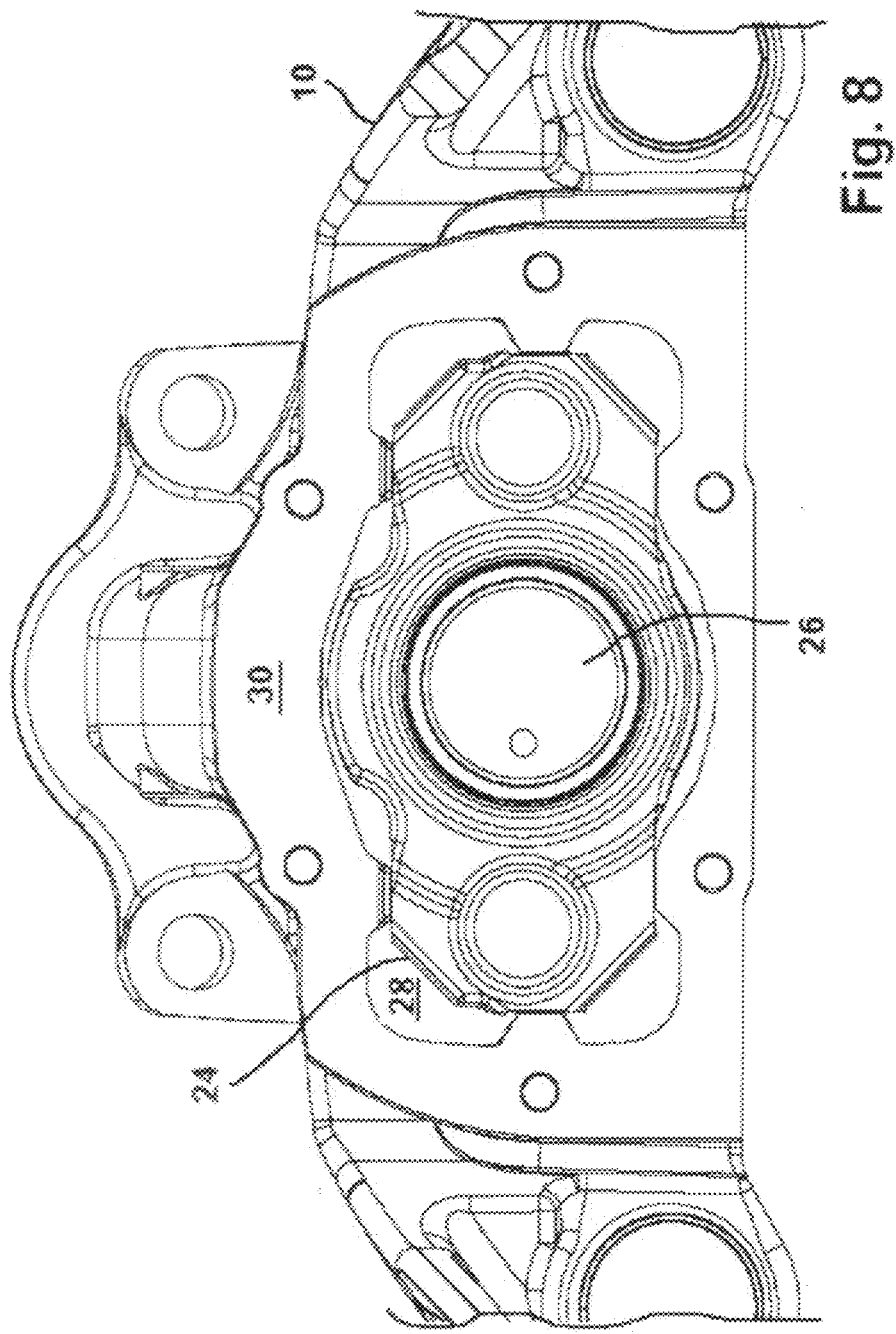
FIG. 8: is the same view as FIG. 4 but with the pressure piece installed

The operational position pursuant to the FIG. 8 is different, however. Here, the pressure piece 24 is already installed and that is why the brake shaft 32 can no longer be seen. The pressure screw device 26 is also assembled.

Figure 9:
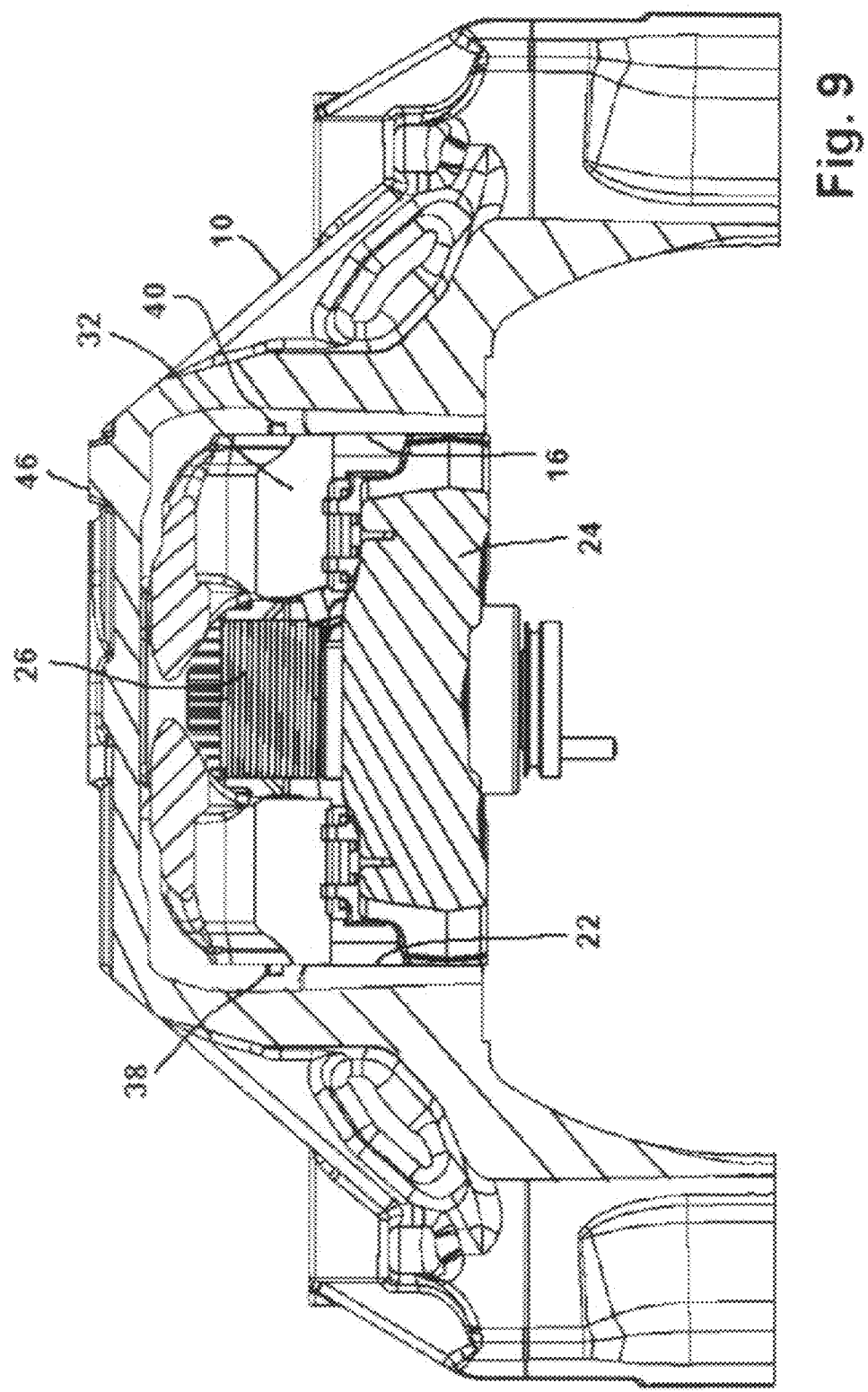
FIG. 9: is the same view as FIG. 7, but with the pressure piece installed.

From FIG. 8 it can moreover be seen that the guide strips 12 to 22 which are serving for the coding of the brake caliper 10 at the same time also serve for the guide of the pressure piece 24. But as can be seen from FIG. 9, the length of the guide strips 12 to 22 are sized such that they do not impair twisting of the brake shaft 32 and/or of the rotary lever 36 in the installed condition. In other words, the brake shaft 32 can also be twisted in the installed condition even in view of the projections 38, 40, without that the projections would strike against the guide strips 12 to 27.

FIG. 10 not only shows the caliper 10 with the rotary lever 36 and the pressure piece 24 in the installed condition, but also plain bearings and/or pivot bearing supports 42, 44 for coupling the brake shaft 32 and the pressure piece 24 on the one hand, and the rear wall 46 of the caliper 10, on the other.

As explained in detail above, the caliper 10 on the one hand, and the rotary lever 36 on the other are "coded" such by the dimensions defined by the design, that the rotary lever 36 can be introduced into the inside of the caliper 10 through the inlet opening 28. In contrast, because of the coding, the installation of another rotary lever, such as a rotary lever with another transmission ratio is excluded, although it could (theoretically) serve for the brake application. This can be achieved by means of a different sizing of the dimensions described above, for example, such as by a different attachment of the projections 38, 40. This will ensure that only the rotary shaft which is provided for the intended field of application is installed in the caliper 10 through the inlet opening 28.

After all functional components have been installed in the brake caliper 10, the inlet opening 28 is closed and sealed by a sealing cover (not shown) and which has at least one opening required for functionality for inserting the at least one pressure screw device is closed and sealed such, that nothing can penetrate into the interior of the caliper to impair the functionality.

The features of the invention disclosed in the above description, the Claims, as well as in the drawing, can be essential both individually as well as in any combinations for the realization of the invention in its different embodiments.

The invention claimed is:

1. A disc brake for commercial vehicles, comprising:
   a brake caliper and a brake shaft which is matched to the brake caliper for applying the brake, wherein the brake caliper comprises an inlet opening with a front aperture formed in a plane that faces a brake disc for installing the brake shaft, wherein the inlet opening comprises at least two guide strips that extend inside the inlet opening substantially perpendicularly to the plane of the front aperture to define dimensions of the inlet opening; and
   a bearing device coupled with the brake caliper to support the brake shaft inside the brake caliper, wherein the bearing device comprises at least one pivot bearing support to couple the brake shaft to the brake caliper,
   wherein the brake shaft includes at least two projections disposed on the brake shaft to match the guide strips in a predetermined rotational position of the brake shaft relative to the inlet opening, wherein the predetermined rotational position defines the coupling of the brake shaft with the brake caliper.

2. The disc brake of claim 1, wherein the dimensions of the inlet opening include a first dimension in a first direction and a second dimension in a second direction that lies transverse to the first direction, wherein the brake shaft has a first dimension in the first direction and a second dimension in the second direction, and
   the first dimension of the brake shaft is smaller than the first dimension of the inlet opening and the second dimension of the brake shaft is smaller than the second dimension of the inlet opening.

3. The disc brake of claim 2, characterized in that the first direction is perpendicular to the second direction.

4. The disc brake of claim 1, characterized in that the brake shaft is an eccentric shaft which supports itself on a wall of the brake caliper and during twisting presses the brake caliper against the brake disc.

5. The disc brake of claim 1, characterized in that the brake shaft is a part of a rotary lever and one rotation axis of the brake shaft lies parallel to a principal plane of the brake disc.

6. The disc brake of claim 1, characterized in that the brake shaft fits through the inlet opening in the predetermined rotational position, after passing through the inlet opening inside the brake caliper, and is twistable for applying the brake.

* * * * *